United States Patent Office 3,137,597

Patented June 16, 1964

3,137,597

METHOD FOR PRODUCING A HIGHLY DOPED ZONE IN SEMICONDUCTOR BODIES

Hubert Patalong, Pretzfeld, Norbert Schink, Erlangen, and Friedrich Hoffenreich, Pretzfeld, Germany, assignors to Siemens-Schuckertwerke Aktiengesellschaft, Berlin, Germany, a corporation of Germany No Drawing. Filed June 12, 1959, Ser. No. 819,828

Claims priority, application Germany June 14, 1958

15 Claims. (Cl. 180—177)

Our invention relates to the processing of semiconductor materials for use in rectifiers, transistors, photodiodes, and other electronic semiconductor devices. The semiconductor body in such devices consists of an essentially monocrystalline body of germanium, silicon, or of an intermetallic compound of respective elements from the third and fifth groups of the periodic system, for example, indium antimonide, indium arsenide or gallium phosphide. These compounds, generally known as $A_{III}B_{V}$ semiconductor compounds, are described in Welker Patent 2,798,989.

The semiconductor body is to be intimately joined with two or more metallic electrodes. The mounting of the electrodes on the semiconductor body may be effected in various ways, for example by diffusion or alloying. According to the alloying method, a foil of the doping substance or a foil of material containing the doping substance is usually employed and after being placed upon a semiconductor wafer is alloyed together therewith by means of a heat treatment. The alloy thus formed is initially liquid and is thereafter permitted to solidify. During solidification the adjacent zone of the semiconductor substance re-crystallizes, and a small amount of the doping material remains in the semiconducting substance that crystallizes first, whereas the remaining amount of the melt solidifies in form of a eutectic composition. A highly doped re-crystallization zone is thus formed in the semiconductor body, and an over-lying alloy-bonded coating of the alloying material containing some semiconductor substance, in solid solution.

The above-described alloying method has been performed by using a foil of a gold alloy which contains the desired doping substance. We refer in this relation to the copending application of R. Emeis, Serial No. 637,029, filed January 29, 1957, Patent 2,960,419.

According to our invention, such an alloying method for providing a semiconductor body with a coalesced electrode, and also with an adjacent highly-doped zone, is further improved by adding to the gold alloy of the foil an amount of 0.01 to 1% bismuth, preferably an amount between 0.3 and 0.4%, all percentages mentioned in this specification being by weight. For producing an n-conducting zone, the foil to be placed upon, and alloyed together with, the semiconductor, may consist of a gold-antimony-bismuth alloy, the amount of antimony, serving as the acceptor-type doping substance, being in accordance with the desired degree of doping, for example, approximately 1%. For producing a p-type zone, the foil may consist of a gold-boron-bismuth alloy, the boron content serving as a donor-type doping substance and being present in an amount depending upon the desired concentration of the doping agent.

Our invention is based upon the discovery that the addition of bismuth to gold greatly increases the wetting ability of gold relative to crystalline semiconductor substances such as silicon, germanium and the above-mentioned compounds, and that the bismuth addition does not cause an appreciable doping of the semiconductor material.

The use of gold with an addition of antimony as donor substance is known for the production of highly-doped zones in semiconductors. The antimony has a strong n-doping property. However, it permits the formation of a uniform alloying front in the semiconductor material only if the antimony content is approximately 0.5%. This high antimony content required for sufficient wetting makes it virtually infeasible to apply counter-doping by other additions. Bismuth, like antimony, belongs to the fifth group of the periodic system of elements and therefore has n-doping properties with respect to semiconductor elements of the fourth group. However, due to its low distribution coefficient in silicon, for example, the presence of bismuth causes only a very slight degree of doping so that the gold alloy can readily be given acceptor (p-doping) property, for example, by adding boron.

Bismuth, in a concentration of 0.01 to 1%, preferably 0.3 to 0.4%, imparts to gold a wetting ability at least equally as good as that obtained with antimony but is much better suited for this purpose because of its only slight doping action, thus permitting the use of gold foils for the production of n-type as well as p-type zones. Very slight admixtures of bismuth are incapable of imparting to gold an appreciable wetting ability, whereas bismuth concentrations higher than 1% result in such a great hardness of the gold-bismuth alloy that they are no longer suitable for rolling them to foil thickness.

An important object and advantage of the method according to the invention, is the fact that it permits the production of semiconductor devices utilizing a semiconducting body having a plurality of highly doped zones of different conductance types, and wherein such differently constituted zones are produced by means of but one heating treatment. This is made possible by virtue of the fact that the gold alloys form an alloying bond with the semiconducting substance at substantially the same temperature, and that this temperature is relatively low. This results in a considerably smaller reduction of the lifetime of the minority carriers, as compared with the doping methods heretofore employed for such purposes.

Another object and outstanding advantage of the invention is the fact that it is no longer necessary to employ different processing treatment for the respective doping ranges of different conductance types. For example, the current connections can be deposited upon the small n-type and p-type electrodes of the semiconductor body in the same manner. The ease with which the gold alloys can be contacted and bonded to the semiconductor material as well as to the electrode leads is thus utilized in a particularly favorable manner. With respect to the etching operations required in the further course of manufacture of the semi-conductor devices, the gold alloys, coalesced by alloying with the semiconductor body, are considerably more suitable than other foils, for example those of aluminum.

There follows an example of the above-described method as applied in the production of a highly-doped p-type zone.

Pulverulent gold and boron powder are intimately mixed, then compressed under pressure and tempered in vacuum or under protective gas at approximately 900° C., and in any event below the melting point of gold=1063° C., for several days. Thereafter the pressed body is placed together with bismuth between two foils of gold and is melted together with these foils in vacuum or in a protective atmosphere. Subsequently, the gold alloy is rolled to foil thickness and suitably shaped pieces are placed upon the semiconductor body, vis. silicon and subjected to the above-mentioned alloying treatment.

For producing zones of n-type conductors, gold is mixed with bismuth, antimony and/or arsenic in the desired concentration and the mixture is melted together in vacuum or protective atmosphere, any desired doping concentration being obtainable in this manner. Thereafter the resulting alloy is rolled to foil thickness and pieces or wafers cut from the foil are placed, and alloyed together with, the silicon wafers.

The method of the present invention can be employed in combination with the further processing steps described in the copending Emeis application Serial No. 637,029, Patent 2,960,419. All of the pertinent disclosure of the latter application is incorporated herein by reference. In this we refer to FIGS. 6, 7, and 8 of the drawing of Serial No. 637,029. The process described in Serial No. 637,029 can be summarized as follows:

A process of making a semiconductor device comprising supporting a carrier body in a housing structure said carrier body providing a flat form-retaining surface, disposing against said carrier body a sandwich comprising a semiconductor wafer having electrode foils on respective opposite faces thereof, firming a body of comminuted material upon the sandwich to substantially immobilize it in the housing structure, and applying heat sufficient to alloy the electrodes to the semiconductor.

The antimony content of the foil of gold-antimony-bismuth alloy described above is preferably in the range of 0.1 to 1% in respect to the gold content.

The boron content of the foil of gold-boron-bismuth alloy is 0.001 to 0.3%, being preferably 0.1%, in respect to the gold.

In the example described above, the gold powder and boron powder are first pressed together and the pressed body is then tempered without application of pressure. It has been found preferable to apply the highest possible pressures, for example in the order of 10,000 atm., when manufacturing the pressed body.

Applicable as n-doping substances, aside from antimony, are, for example, phosphorous and arsenic. Suitable as p-doping substances, aside from boron, are indium and gallium, for example. However, indium and gallium have only a very weak doping action, boron being preferable.

The thickness of the silicon disc ranges from 0.08 to 0.4 mm., being preferably 0.12 mm. A preferred diameter is 12 mm. The gold foil has a thickness of 0.05 mm. and is 9 mm. in diameter.

We claim:

1. A method for producing a highly-doped zone in a body of substantially monocrystalline silicon semiconductor material, comprising alloying a foil of a pre-prepared gold alloy together with the semiconductor material by heating the silicon and the alloy while in contact with each other, the alloy being an alloy of gold and a doping substance with 0.01 to 1% free bismuth.

2. A method for producing a doped-zone in a semiconductor body of substantially monocrystalline silicon comprising alloying a foil of a pre-prepared gold alloy together with the semi-conductor material by heating the silicon and the alloy while in contact with each other, the alloy being an alloy of gold and a doping substance and further containing 0.3 to 0.4% bismuth metal.

3. A method for producing an n-type doped-zone in a semiconductor body of substantially monocrystalline silicon comprising alloying a foil of a prepared gold alloy together with the semiconductor material by heating the silicon and the alloy while in contact with each other, the alloy being an alloy of the metals gold, antimony and bismuth, the bismuth content being from 0.01 to 1%.

4. A method for producing a p-type doped-zone in a semiconductor body of substantially monocrystalline silicon comprising alloying a foil of a previously prepared gold alloy together with the semiconductor material by heating the silicon and the alloy while in contact with each other, the alloy being an alloy of gold, boron, and bismuth metal, the bismuth content being from 0.01 to 1%.

5. A method for producing a doped-zone in a semiconductor body of substantially monocrystalline silicon comprising alloying a foil of a previously prepared gold alloy together with the semiconductor material by heating the silicon and the alloy while in contact with each other, the alloy being an alloy of gold, arsenic, and bismuth, the bismuth metal content being from 0.01 to 1%.

6. A method for producing a p-type doped-zone in a semiconductor body of substantially monocrystalline silicon comprising alloying a foil of a previously prepared gold alloy together with the semiconductor material by heating the silicon and the alloy while in contact with each other, the alloy being an alloy of gold, boron, and bismuth metal, the bismuth content being from 0.01 to 1%, said alloy being produced by intimately mixing gold powder and boron powder, compressing the mixture and subjecting the compressed mixture to heat tempering for several days at about 900° C., and the resulting body being placed together with bismuth between two gold foils and melted together with the foils.

7. A method of joining an electrode to and producing a doped-zone in a semiconductor body taken from the group consisting of silicon, germanium and $A_{III}B_{V}$ semiconductor compounds, comprising alloying a previously prepared gold alloy foil together with the semiconductor material by placing the foil against a surface of the body and applying heat to form molten alloy, the gold alloy being an alloy of gold and a doping substance, with 0.01 to 1% of bismuth metal, permitting the molten alloy to solidify, whereby the adjacent zone of the semiconductor crystallizes, doping material remaining therein, and there is produced an overlying alloy-bonded coating of the alloy containing some of the semiconductor substance in solid solution.

8. A method for producing an n-doped-zone in a semiconductor body of substantially monocrystalline silicon comprising alloying a previously prepared gold alloy together with the semiconductor material by heating the silicon and the alloy at a temperature below the melting point of silicon, while in contact with each other, the alloy being a ternary alloy of gold, antimony and bismuth metal, containing about 0.01 to 1% bismuth, and about 0.01 to 1% antimony.

9. A method for producing a p-doped-zone in a semiconductor body of substantially monocrystalline silicon comprising alloying a previously prepared gold alloy together with the semiconductor body by heating the silicon and the alloy at a temperature below the melting point of silicon, while in contact with each other, the alloy being a ternary alloy of gold, boron, and bismuth metal containing about 0.01 to 1% bismuth, and about 0.0001 to 0.3% boron.

10. A method of producing a plurality of doped zones of different conductance types in a semiconductor body of substantially monocrystalline silicon, comprising alloying a plurality of foils of gold alloys together with the silicon semiconductor material by placing the foils in contact with respective surfaces of the silicon, and heating while in contact with said silicon, said gold alloys being alloys of gold and metallic bismuth, the bismuth content being about 0.01 to 1%, at least one of said gold foils containing p-doping substance, and at least one of said gold foils containing n-doping substance.

11. The method defined in claim 10, the n-doping substance being antimony, the p-doping substance being boron.

12. The method defined in claim 11, the bismuth content being about 0.3 to 0.4%.

13. A method for producing a p-doped zone in a semiconductor body of substantially monocrystalline silicon, comprising alloying a foil of gold alloy together with the silicon semiconductor material by heating them while they are in contact with each other, said gold alloy being an alloy of gold, a p-doping substance, and bismuth metal, the bismuth content being from 0.01 to 1%.

14. The method defined in claim 3, the bismuth metal content of the alloy being from about 0.3 to 0.4%, to minimize doping action by the bismuth.

15. The method defined in claim 4, the bismuth metal content of the alloy being from about 0.3 to 0.4%, to minimize doping action by the bismuth.

References Cited in the file of this patent

UNITED STATES PATENTS

| | | |
|---|---|---|
| 2,701,326 | Pfann et al. | Feb. 1, 1955 |
| 2,742,383 | Barnes et al. | Apr. 17, 1956 |
| 2,847,335 | Gremmelmaier et al. | Aug. 12, 1958 |
| 2,877,147 | Thurmond | Mar. 10, 1959 |
| 2,878,432 | Armstrong et al. | Mar. 17, 1959 |
| 2,887,415 | Stevenson | May 19, 1959 |
| 2,898,528 | Patalong | Aug. 4, 1959 |
| 2,959,501 | Schink et al. | Nov. 8, 1960 |
| 2,965,519 | Christensen | Dec. 20, 1960 |
| 3,009,840 | Emeis | Nov. 21, 1961 |